US007668436B2

(12) United States Patent
Kato et al.

(10) Patent No.: US 7,668,436 B2
(45) Date of Patent: Feb. 23, 2010

(54) VIDEO INFORMATION RECORDING DEVICE AND REPRODUCING DEVICE

(75) Inventors: Motoki Kato, Kanagawa (JP); Masanobu Nakamura, Tokyo (JP)

(73) Assignee: Sony Corporation (JP)

( * ) Notice: Subject to any disclaimer, the term of this patent is extended or adjusted under 35 U.S.C. 154(b) by 935 days.

(21) Appl. No.: 10/363,750

(22) PCT Filed: Jul. 12, 2002

(86) PCT No.: PCT/JP02/07133

§ 371 (c)(1),
(2), (4) Date: Mar. 6, 2003

(87) PCT Pub. No.: WO03/007601

PCT Pub. Date: Jan. 23, 2003

(65) Prior Publication Data

US 2003/0175013 A1 Sep. 18, 2003

(30) Foreign Application Priority Data

Jul. 13, 2001 (JP) ............................ 2001-214540

(51) Int. Cl.
*H04N 5/76* (2006.01)
*H04N 5/00* (2006.01)

(52) U.S. Cl. ........................................ 386/94; 386/125

(58) Field of Classification Search ..................... 386/1, 386/94, 45-46, 83.94, 125-126; 360/60; 380/201
See application file for complete search history.

(56) References Cited

U.S. PATENT DOCUMENTS 5,541,738 A * 7/1996 Mankovitz .................. 386/83
5,987,126 A * 11/1999 Okuyama et al. ........... 380/203
6,618,549 B1 * 9/2003 Kato et al. .................... 386/94

FOREIGN PATENT DOCUMENTS

| | | | |
|---|---|---|---|
| EP | 1 045 389 | A1 | 10/2000 |
| EP | 1 168 343 | A | 1/2002 |
| JP | 09-245438 | A | 9/1997 |
| JP | 2000-149416 | A1 | 5/2000 |
| JP | 2001-86444 | A1 | 3/2001 |
| JP | 2001-266546 | A | 9/2001 |
| JP | 2002-050116 | A | 2/2002 |
| JP | 2002-084497 | A | 3/2002 |
| JP | 2002-150672 | A | 5/2002 |
| JP | 2002-152667 | A | 5/2002 |
| JP | 2002-271756 | A1 | 9/2002 |

* cited by examiner

*Primary Examiner*—Thai Tran
*Assistant Examiner*—Nigar Chowdhury
(74) *Attorney, Agent, or Firm*—Lerner, David, Littenberg, Krumholz & Mentlik, LLP

(57) ABSTRACT

A method is provided for recording video information in which copy control information of video information is managed in the case of copying the content of data from one recording medium to another recording medium. Copy control information (CCI) or a watermark (WM) of an inputted AV stream is detected and whether the content of the copy control information or watermark has changed is determined. Change point information of the copy control information or watermark and the content of the copy control information or watermark are acquired, and management information for managing the copy control information is generated on the basis of the acquired change point information. The generated management information is recorded together with the video information to a recording medium at a copy destination.

11 Claims, 18 Drawing Sheets

| SYNTAX | No.of bits | Mnemonic |
|---|---|---|
| source_packet() { | | |
| **TP_extra_header()** | | |
| **transport_packet()** | | |
| } | | |

FIG.4

| SYNTAX | No.of bits | Mnemonic |
|---|---|---|
| TP_extra_header() { | | |
| **copy_permission_indicator** | 2 | uimsbf |
| **arrival_time_stamp** | 30 | uimsbf |
| } | | |

FIG.5

| copy_permission_indicator | meaning |
|---|---|
| 00 | copy free |
| 01 | no more copy |
| 10 | copy once |
| 11 | copy prohibited |

FIG.6

| SYNTAX | No. of bits | Mnemonic |
|---|---|---|
| zzzzz.clpi { | | |
| **version_number** | 8*4 | bslbf |
| **SequenceInfo_start_address** | 32 | uimsbf |
| **ProgramInfo_start_address** | 32 | uimsbf |
| **CPI_start_address** | 32 | uimsbf |
| **ClipMark_start_address** | 32 | uimsbf |
| **MakersPrivateData_start_address** | 32 | uimsbf |
| reserved_for_future_use | 96 | bslbf |
| **ClipInfo()** | | |
| for (i=0; i<N1 ; i++){ | | |
| **padding_word** | 16 | bslbf |
| } | | |
| **SequenceInfo()** | | |
| for (i=0; i<N2 ; i++){ | | |
| **padding_word** | 16 | bslbf |
| } | | |
| **ProgramInfo()** | | |
| for (i=0; i<N3 ; i++){ | | |
| **padding_word** | 16 | bslbf |
| } | | |
| **CPI()** | | |
| for (i=0; i<N4 ; i++){ | | |
| **padding_word** | 16 | bslbf |
| } | | |
| **ClipMark()** | | |
| for (i=0; i<N5 ; i++){ | | |
| **padding_word** | 16 | bslbf |
| } | | |
| **MakersPrivateData()** | | |
| for (i=0; i<N6 ; i++){ | | |
| **padding_word** | 16 | bslbf |
| } | | |
| } | | |

FIG.7

| SYNTAX | No. of bits | Mnemonic |
|---|---|---|
| ClipInfo(){ | | |
| length | 32 | uimsbf |
| reserved_for_future_use | 16 | bslbf |
| Clip_stream_type | 8 | uimsbf |
| reserved_for_word_align | 6 | bslbf |
| transcode_mode_flag | 1 | bslbf |
| controlled_time_flag | 1 | bslbf |
| TS_average_rate | 32 | uimsbf |
| TS_recording_rate | 32 | uimsbf |
| CCI_sequence_info() | | |
| TS_type_info_block() | | |
| if (Clip_stream_type=="Bridge-Clip AV stream"){ | | |
| preceding_Clip_information_file_name | 8*10 | bslbf |
| SPN_exit_from_preceding_Clip | 32 | uimsbf |
| following_Clip_information_file_name | 8*10 | bslbf |
| SPN_enter_to_following_Clip | 32 | uimsbf |
| } | | |
| } | | |

FIG.8

| SYNTAX | No. of bits | Mnemonic |
|---|---|---|
| CCI_sequence_info() { | | |
| **length** | 16 | uimsbf |
| reserved | 15 | bslbf |
| recording mode | 1 | uimsbf |
| num_of_CCI_sequences | 16 | uimsbf |
| for (i=0; i< num_of_CCI_sequences; i++){ | | |
| **SPN_CCI_sequence_start** | 32 | uimsbf |
| stream_status() | 16 | uimsbf |
| } | | bslbf |
| **Integrity_Check_Value** | 128 | uimsbf |
| } | | |

FIG.10

| | | |
|---|---|---|
| stream_status() { | | |
| reserved | 11 | bslbf |
| status_CCI/EMI | 2 | uimsbf |
| is_status_WM_valid | 1 | uimsbf |
| stataus_WM | 2 | uimsbf |
| } | | |

FIG.11

| | | |
|---|---|---|
| stream_status() { | | |
| reserved | 15 | |
| is_free | 1 | uimsbf |
| } | | |

FIG.12

| recording_mode | meaning |
|---|---|
| 0 | Non-Cognizant RECORDING |
| 1 | cognizant RECORDING |

FIG.13

| status_CCI/EMI, status_WM | meaning |
|---|---|
| 00 | copy free |
| 01 | no more copy |
| 10 | copy once |
| 11 | copy prohibited |

FIG.14

CCI_sequence_Info()

| SPN_CCI_sequence_strat | status_CCI/EMI | status_WM | is_free |
|---|---|---|---|
| 0 | 00 | 00 | 1 |
| A | 01 | 01 | 0 |
| B | 00 | 00 | 1 |
| C | 01 | 01 | 0 |
| D | 00 | 00 | 1 |

COPY OF AV STREAM

CCI_sequence_Info()

| SPN_CCI_sequence_start | status_CCI/EMI | status_WM | is_free |
|---|---|---|---|
| 0 | 00 | 00 | 1 |

| SYNTAX | No. of bits | Mnemonic |
|---|---|---|
| CCI_sequence_info() { | | |
| **length** | 16 | uimsbf |
| reserved | 15 | bslbf |
| recording_mode | 1 | uimsbf |
| num_of_CCI_sequences | 16 | uimsbf |
| for (i=0; i< num_of_CCI_sequences; i++) { | | |
| **Time_stamp_CCI_sequence_start** | 32 | uimsbf |
| stream_status() | 16 | uimsbf |
| } | | bslbf |
| **Integrity_Check_Value** | 128 | uimsbf |
| } | | |

FIG.16

CCI_sequence_Info()

| Time_stamp_CCI_sequence_strat | status_CCI/EMI | status_WM | is_free |
|---|---|---|---|
| 0 | 00 | 00 | 1 |
| A | 01 | 01 | 0 |
| B | 00 | 00 | 1 |
| C | 01 | 01 | 0 |
| D | 00 | 00 | 1 |

COPY OF AV STREAM

CCI_sequence_Info()

| Time_stamp_CCI_sequence_strat | status_CCI/EMI | status_WM | is_free |
|---|---|---|---|
| 0 | 00 | 00 | 1 |

| STATUS OF INPUT SIGNAL | | STATUS OF RECORDED AV STREAM | | | |
|---|---|---|---|---|---|
| CCI | WM | CCI_o | WM_o | E_CCI | status_CCI/EMI, status_WM. copy_permission_indicator(c_p_I) |
| 00 | 00 | 00 | 00 | 00 | 00 |
| 01 | 101 | CANNOT RECORD | | | |
| 10 | 10 | 01 | 101 | 01 | 01 |
| 11 | 11 | CANNOT RECORD | | | |

00 : copy free
01, 101 : no more copy
10 : copy once
11 : copy prohibited

FIG.19

| STATUS OF INPUT SIGNAL | STATUS OF RECORDED AV STREAM | |
|---|---|---|
| EMI | CCI_o | status_E_CCI/EMI, copy_permission_indicator(c_p_I) |
| 00 | 00 | 00 |
| 01 | CANNOT RECORD | |
| 10 | 01 | 01 |
| 11 | CANNOT RECORD | |

FIG.20

VIDEO INFORMATION RECORDING DEVICE AND REPRODUCING DEVICE

TECHNICAL FIELD

This invention relates to a video information recording device and a reproducing device, and particularly to a video information recording device and a video information reproducing device which enable proper management of copy control for a recording medium.

BACKGROUND ART

Various optical discs such as DVR have been proposed as disc-like recording media that can be loaded in and unloaded from a recording/reproducing device. The optical discs as such recording media have been proposed as media with a large capacity of several gigabytes or more and are expected to be media for recording audio/visual (AV) signals such as video signals.

As a coding system for digitally compressing AV signals, there is an MPEG (Moving Picture Experts Group) 2 system. This MPEG2 is a dynamic image compression format of an international standard aimed at realizing higher image quality by using compression techniques such as motion compensation prediction, DCT (discrete cosine transform), quantization and variable-length coding. The MPEG2 system is applied also in the case of recording AV signals to a recording medium. For example, when recording analog video signals to a recording medium, the video signals are encoded in accordance with the MPEG2 system and the coded bit stream is recorded to the medium. In the digital television broadcast, which has started recently, an AV stream coded in accordance with the MPEG2 system is transmitted in a format called "transport stream". When recording the digital broadcast to a recording medium, it is considered that digital signals of a transport stream are directly recorded without being decoded and re-encoded.

In the case where AV signals are recorded to a recording medium in a digital signal format, it is possible to copy the AV signals to another recording medium without deteriorating the signals at all. However, this raises a serious problem for copyright holders of AV signals. Thus, in order to limit copying of AV signals, copy control information (CCI) indicating "Copy Free" (which means that copying is permitted), "Copy Once" (which means that copying of only one generation is permitted), "No More Copy (which means that copying of this and further generations is not permitted)", or "Copy Prohibited" (which means that copying is prohibited) may be provided for AV signals.

For example, a system that is practically used for video signals at present is the CGMS (Copy Generation Management System). The CGMS is a system for controlling the number of times copying is permitted on the software side. The CGMS for analog interface is called "CGMS-A", and the CGMS for digital interface is called "CGMS-D". The analog CGMS-A is also called "VBID" because it superimposes an ID on a VBI (vertical blanking interval). This is standardized as EIAJ CP-1204. Moreover, in order to transmit copy control information in a transport stream, a method of coding a descriptor having copy control information is used. Descriptors of such types may be a DTCP descriptor prescribed by a DTLA (Digital Transmission Licensing Administrator) and a digital_copy_control_descriptor prescribed by the ARIB (Association of Radio Industries and Businesses) and used in the Japanese BS digital broadcast. Recently, in order to enforce further copy control, a system for embedding copy control information called "watermark" (WM) into baseband AV signals or MPEG AV streams is considered. Watermarking (WM) is now being standardized, and a millennium system and a galaxy system are proposed.

When recording AV signals to a recording medium, recording control must be accurately carried out in accordance with the copy control information of input signals. In general, in the case where a user recorded AV signals to a recording medium by using a recording device, the copy control information of the AV stream on the recording medium is either "Copy Free" (which means that copying is permitted) or "No More Copy" (which means that copying of this and further generations is not permitted). "No More Copy" results from updating of the copy control information when AV signals of "Copy Once" (which means only one generation of copying is permitted) are recorded.

Meanwhile, the increase in capacity of recording media enables recording of more AV streams to the recording media, as described above. In this case, the user needs to copy desired data of the AV streams from the respective discs. The user can copy AV streams having copy control information of "Copy Free".

The increase in recording capacity of recording media enables continuous recording of AV streams for a longer time than before. In such a case, it is considered that a stream part of "No More Copy" and a stream part of "Copy Free" exist in one AV stream more often. For example, when two programs are continuously recorded, it may be considered that the first program is a material of "Copy Free" and the second program is a material of "Copy Once".

Conventionally, in the case where a "No More Copy" stream part and a "Copy Free" stream part exist in one AV stream, the user cannot properly copy these parts to another recording medium. For example, if a "No More Copy" stream part exists at the beginning of one AV stream, the user cannot copy a "Copy Free" stream part at a halfway part in the AV stream. This is because it is difficult to know that plural pieces of control information exist in one AV stream, that is, to know that a "No More Copy" stream part and a "Copy Free" stream part exit in one AV stream. To know this, the user must read out the AV stream from the beginning to the end and analyze the copy control information. However, this analysis is time-consuming. Particularly with an AV stream of a long duration, it is difficult to read out all of the AV stream and grasp the presence of control information.

SUMMARY OF THE INVENTION

In view of the foregoing status of the art, it is an object of the present invention to provide a new video information recording device and recording method which enable proper management of copy control information of video information, and to provide a video information reproducing device.

In order to achieve the above-described object, a video information recording device according to the present invention comprises: detection means for detecting copy control information in a CGMS signal of video information, a watermark of video information, copy control information coded in a transport stream of video information, and an EMI (encryption mode indicator) or the like of an IEEE1394 isochronous packet of video information; change point information acquisition means for acquiring change point information of copy control information corresponding to video information to be recorded on the basis of the detected copy control information; management information generation means for generating management information for managing the copy control information on the basis of the acquired change point information; recording means for recording the generated management information together with the video information; and falsification prevention processing means for performing falsification prevention processing of the management information generated by the management information generation means.

A video information reproducing device according to the present invention comprises: recognition means for recognizing a stream part that can be copied from a stream, such as an AV stream recorded on a recording medium, on the basis of management information (CCI_sequence_inforo) for managing copy control information; AV stream preparation means for preparing a new stream composed of stream parts of a section to be copied, on the basis of the recognized stream parts that can be copied; management information generation means for generating management information for reproducing the stream part that can be copied and recognized by the recognition means; and transmission means for transmitting the new stream prepared by the stream preparation means and the management information generated by the management information generation means to a recording device.

A video information recording method according to the present invention comprises: inspecting whether at least one of copy control information in an inputted signal such as an AV signal, content of a watermark, and an EMI (encryption mode indicator) in an isochronous packet has changed; acquiring change point information of the changed copy control information, watermark or EMI; and preparing management information for managing the copy control information or watermark on the basis of the acquired change point information.

The present invention can also provide a storage medium in which a program to be executed by a computer is stored in such a manner that the computer can read the program to execute various functions.

The present invention can also provide a recording medium read by a signal processing device such as a recording medium reproducing device or recording device. In the storage area of this recording medium, for example, a clip AV stream file (stream file) and a clip information file (attached information) are recorded in a clip, which includes a pair made up of one stream, for example, an AV stream, and attached information of this stream, as one object. This clip information file contains management information for managing a change point of copy control information in the stream.

The clip stream file may contain a "Copy Free" stream part that can be copied and a "No More Copy" stream part that cannot be copied in this and further generations. The management information contained in the clip information file may contain information indicating the number of pieces of copy control information and information about an address or time of the change point of the copy control information. Thus, the copy control information of the stream stored in the recording medium can be easily grasped. Moreover, the clip information file may contain a code indicating that the content of the management information has not been falsified. Thus, malicious copying can be prevented.

The other objects of the present invention and specific advantages provided by the present invention will be further clarified by the following description with reference to the appended drawings.

BRIEF DESCRIPTION OF THE DRAWINGS

FIG. 4 is a view showing a programming syntax of a source packet.

FIG. 5 is a view showing a syntax of TP_extra_header.

FIG. 6 is a view showing the relation between values of copy_permission indicator and modes designated by these values.

FIG. 7 is a view showing a syntax of a clip information file.

FIG. 8 is a view showing a syntax of ClipInfo( ).

FIG. 10 is a view showing a syntax of CCI_sequence_info( ).

FIG. 11 is a view showing an exemplary syntax of stream_status( ).

FIG. 12 is a view showing another exemplary syntax of stream_status( ).

FIG. 13 is a view showing the meanings of values of recording_mode.

FIG. 14 is a view showing the meanings of values of status_CCI/EMI, status_μM.

FIG. 16 is a view showing another exemplary syntax of CCI_sequence_info( ).

FIG. 19 is a view for explaining copy control processing in the case where an input signal is a video input and/or a TS input of cognizant recording.

FIG. 20 is a view for explaining copy control processing by a controller in the case where an input signal is a TS input of non-cognizant recording.

DETAILED DESCRIPTION

A video information recording device and reproducing device to which the present invention is applied will now be described with reference to the drawings.

Before explaining a system structure to which the present invention is applied, a data format to which the present invention is applied will be described.

Figure 1:
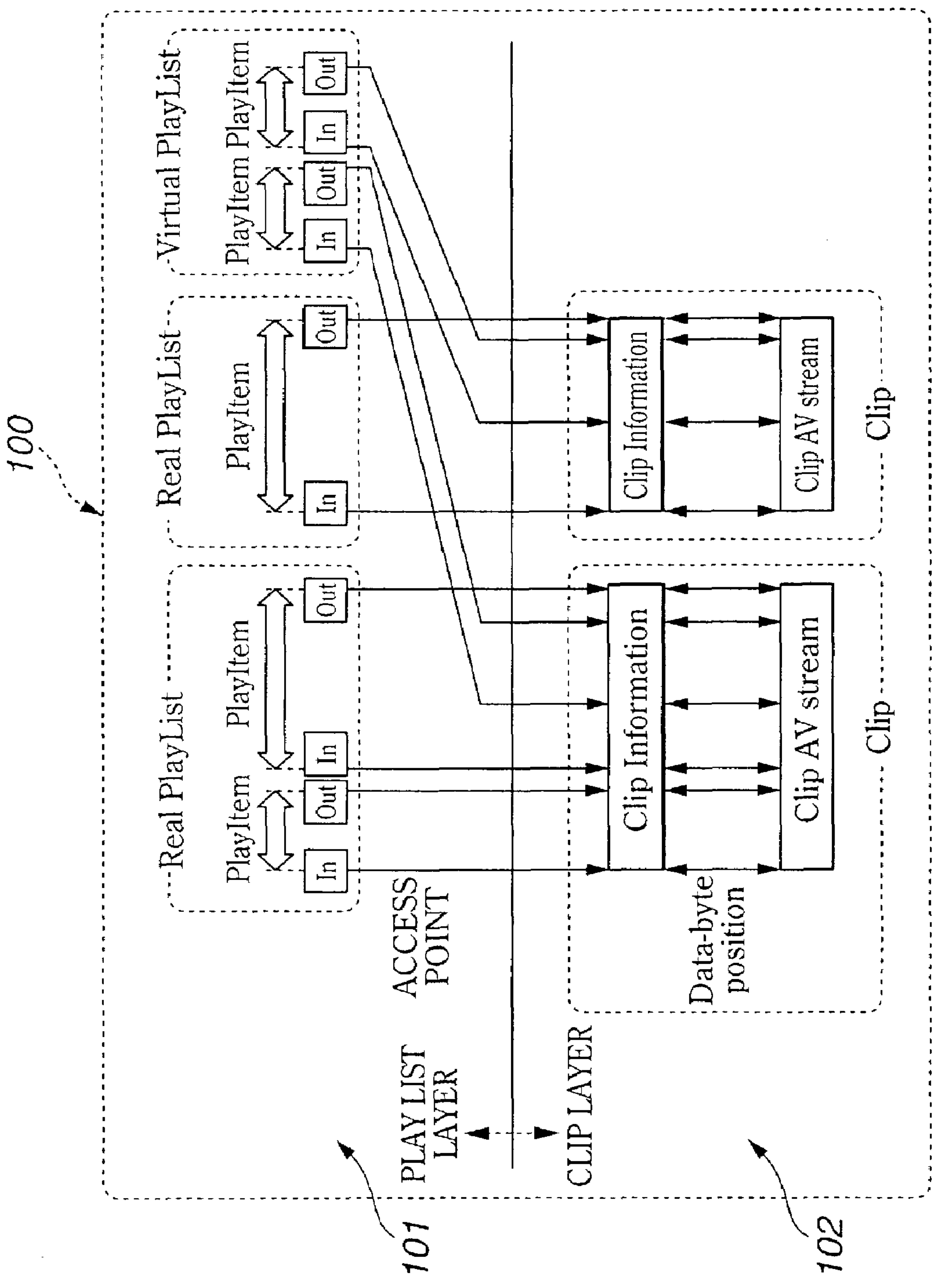
FIG. 1 is a view showing a structure of an application format of a recording medium to which the present invention is applied.

FIG. 1 shows a structure of an application format for a recording medium to which the present invention is applied. This format has two layers for management of AV streams, that is, a play list layer 101, which is approximate to a user interface (user I/F), and a clip layer 102, which is approximate to a system. Volume information 100 manages the clips and play list of the disc.

A pair made up of an AV stream and its attached information is assumed to be one object, which is called a "clip". An AV stream file is called a "clip AV stream file", and its attached information is called a "clip information file". One clip AV stream file stores data in which MPEG2 transport streams are arranged in a structure prescribed by a DVR application format.

In general, a data file used in a computer or the like is handled as a byte string. However, the content of a clip AV stream file is expanded on the time base, and a play list designates an access point in the clip mainly by using a time stamp. When a time stamp for an access point in the clip is given by the play list, the clip information file is useful for finding address information at which decoding of a stream should be started in the clip AV stream file.

The play list is provided for a user to select a desired reproducing section in the clip and easily edit that section. One play list is a collection of reproducing sections of the clip. One reproducing section of a certain clip is called a "play item", which is represented by a set of IN-point (in-time) and OUT-point (out-time) on the time base. That is, a play list is a collection of play items.

There are two types of play lists. One type is a real play list and the other is a virtual play list. The real play list is considered to share stream parts of the clip which it refers to. That is, the real play list occupies the data volume in the disc equivalent to stream parts of the clip which it refers to. When an AV stream is recorded as a new clip, a real play list referring to the reproducible range in the entire clip is automatically produced. If a part of the reproducible range in the real play list is erased, data of the stream part of the clip which it refers to will be erased. The virtual play list is considered not to share the data of the clip. Even if the virtual play list is changed or erased, the clip will not be changed at all.

In the following description, the real play list and the virtual play list are generally referred to as play list.

As a necessary directory on a DVR disc, first, a root directory including a "DVR" directory is provided. The "DVR" directory includes a "PLAYLIST" directory, a "CLIPINF" directory, a "STREAM" directory and a "DATA" directory. Other directories may be prepared under the root directory but they are omitted in this DVR application format.

Figure 2:
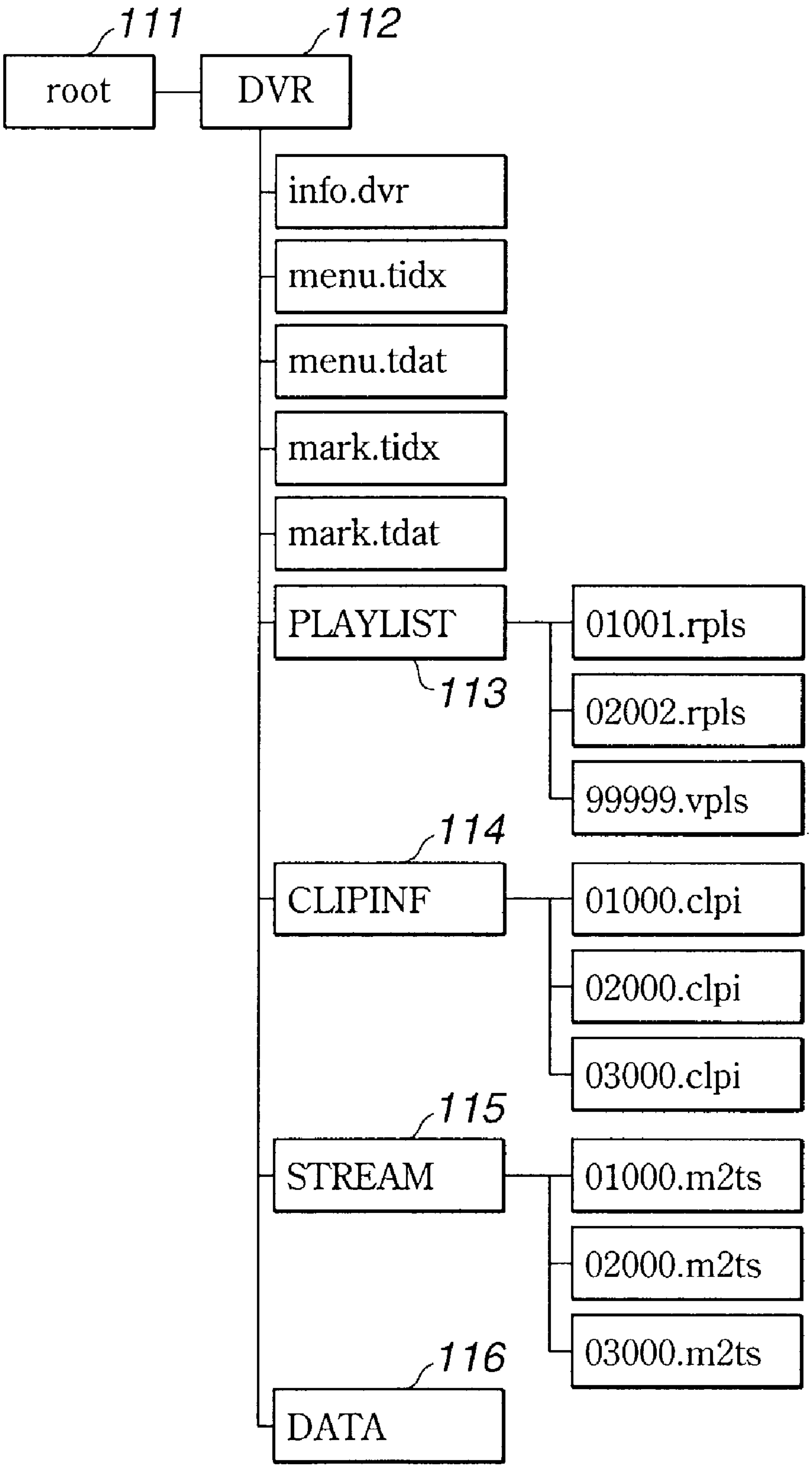
FIG. 2 is a view showing an exemplary directory structure prepared on a DVR disc.

FIG. 2 shows an exemplary directory structure prepared on a DVR disc.

A root directory 111 includes one directory ("DVR" directory 112). The "DVR" directory is a directory under which all the files and directories prescribed by the DVR application format must be stored.

The "DVR" directory 112 includes four directories, that is, a "PLAYLIST" directory 113, a "CLIPINF" directory 114, a "STREAM" directory 115, and a "DATA" directory 116.

The "PLAYLIST" directory is a directory under which database files of real play lists and virtual play lists must be arranged. This directory must exist even if there is no play list.

The "CLIPINF" directory is a directory under which databases of clips must be arranged. This directory must exist even if there is no clip.

The "STREAM" directory is a directory under which AV stream files must be arranged. This directory must exist even if there is no AV stream file.

The "PLAYLIST" directory 113 stores two types of play list files, that is, the above-described real play list and virtual play list.

A "xxxxx.rpls" file stores information related to one real play list. A file is prepared for each real play list. Its file name is "xxxxx.rpls", and "xxxxx" consists of five numerals from 0 to 9. The file extension must be "rpls".

A "yyyyy.vpls" file stores information related to one virtual play list. A file is prepared corresponding to each virtual play list. Its file name is "yyyyy.vpls", and "yyyyy" consists of five numerals from 0 to 9. The file extension must be "vpls".

The "CLIPINF" directory 114 stores a file for each AV stream file.

A "xxxxx.clpi" file is a clip information file corresponding to an AV stream file (clip AV stream file or bridge-clip AV stream file). Its file name is "zzzzz.clpi", and "zzzzz" consists of five numerals from 0 to 9. The file extension must be "cli".

The "STREAM" directory 115 stores files of AV streams.

A "zzzzz.m2ts" file is an AV stream file handled by the DVR system. This is a clip AV stream file or bridge-clip AV stream file. Its file name is "zzzzz.m2ts", and "zzzzz" consists of five numerals from 0 to 9. The file extension must be "m2ts". An AV stream file and a clip information file corresponding thereto must use the same five numerals "zzzzz".

The other directories and file names will not be described here.

Figure 3:
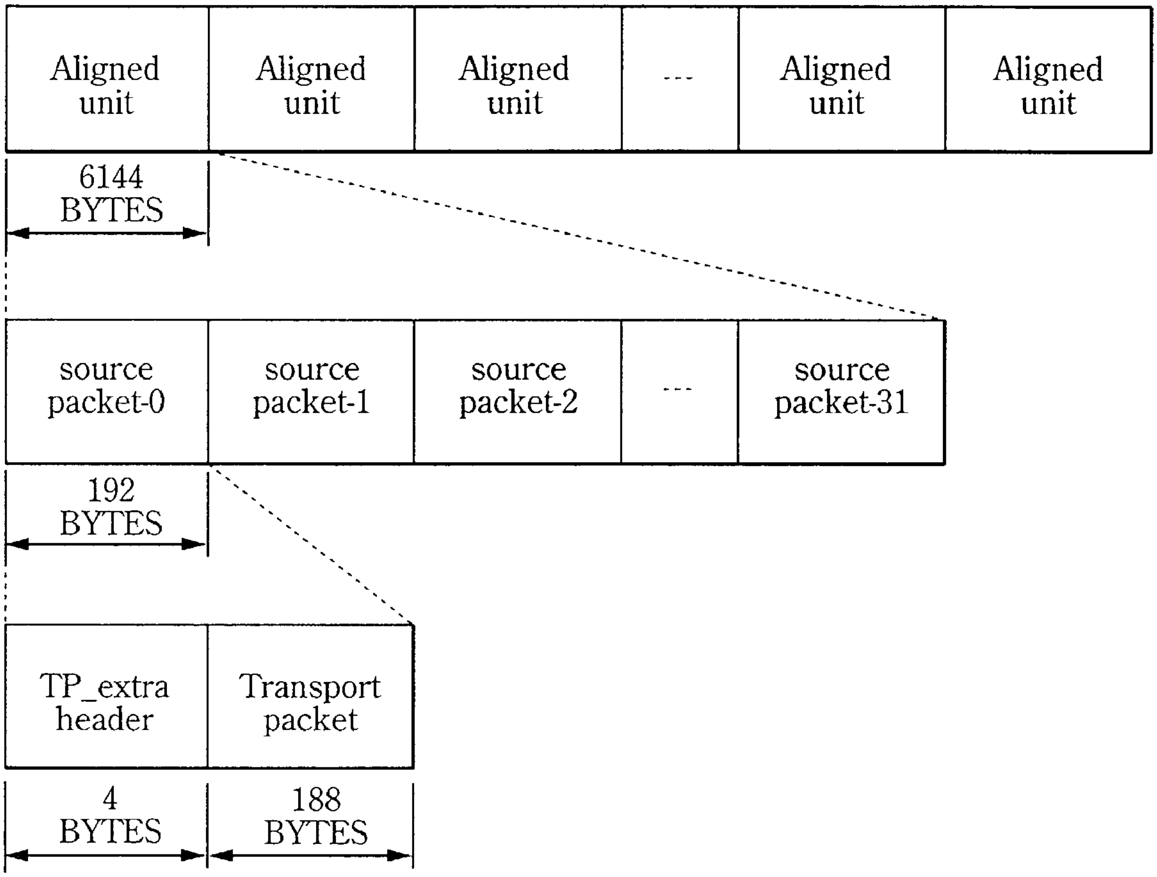
FIG. 3 is a view showing a structure of an AV stream file.

FIG. 3 shows a structure of an AV stream file. An AV stream file must have a DVR MPEG2 transport stream structure shown in FIG. 3. As can be seen from FIG. 3, the DVR MPEG2 transport stream has the following features:

1) the DVR MPEG2 transport stream is made up of an integral number of aligned units;

2) an aligned unit has a size of 6144 bytes (2048×3 bytes);

3) an aligned unit starts at the first bytes of a source packet;

4) a source packet has a length of 192 bytes. One source packet is made up of TP_extra_header and a transport packet. TP_extra_header has a length of 4 bytes and a transport packet has a length of 188 bytes; and 5) an aligned unit is made up of 32 source packets.

The DVR MPEG2 transport stream also has the following features:

6) the last aligned unit in the DVR transport stream is made up of 32 source packets; and 7) if the last aligned unit is not perfectly filled with transport packets of the input transport stream, the area of the remaining bytes must be filled with source packets having null packets (transport packets of PID=0x1FFF).

FIG. 4 shows a programming syntax of a source packet. TP_extra_header( ) is a header with a length of 4 bytes. Transport_packet( ) is an MPEG2 transport packet with a length of 188 bytes prescribed by ISO/IEC13818-1.

FIG. 5 shows a syntax of TP_extra_header. Copy_permission_indicator is an integer representing copy control of payload of the transport packet. The copy control may be expressed as "copy free", "no more copy", "copy once" or "copy prohibited". Arrival_time_stamp is a time stamp indicating the time when the corresponding transport packet in the AV stream arrives at a decoder.

FIG. 6 shows the relation between values of copy_permission_indicator and modes designated by these values. Copy_permission_indicator is appended to all the transport packets. When recording an input transport stream using an IEEE1394 digital interface, the value of copy_permission_ indicator may be associated with the value of an EMI (encryption mode indicator) in an IEEE1394 isochronous packet header. When recording an input transport stream without using an IEEE1394 digital interface, the value of copy_permission_ indicator may be associated with the value of copy control information (CCI) embedded in the transport packets. When self-encoding a video input, the value of copy_permission_ indicator may be associated with the value of the CGMS of the input signal.

A database format for managing reproduction information of an AV stream file will now be described.

FIG. 7 shows a syntax of a clip information file. The clip information file has ClipInfo( ), SequenceInfo( ), ProgramInfo( ), CPI( ), ClipMark( ), and MarkersPrivateData( ).

FIG. 8 shows a syntax of ClipInfo( ). CCI_sequence_ info( ) in ClipInfo( ) has information for managing copy control information of a clip AV stream and defines information of a CCI-sequence.

The CCI-sequence will be described first. A source packet string having a constant CCI content in the AV stream file is called "CCI-sequence". In the AV stream file, an address where the CCI content changes is stored in CCI sequence_ info( ). This address is indicated by SPN_CCI_sequence_start. The CCI-sequences, except for the last CCI-sequence in the AV stream file, start with a source packet indicated by that SPN_CCI_sequence_start and end with a source packet immediately before a source packet indicated by the next SPN_CCI_sequence_start. The last CCI-sequence starts with a source packet indicated by that SPN_CCI_sequence_start and ends with the last source packet of the AV stream file.

Figure 9:
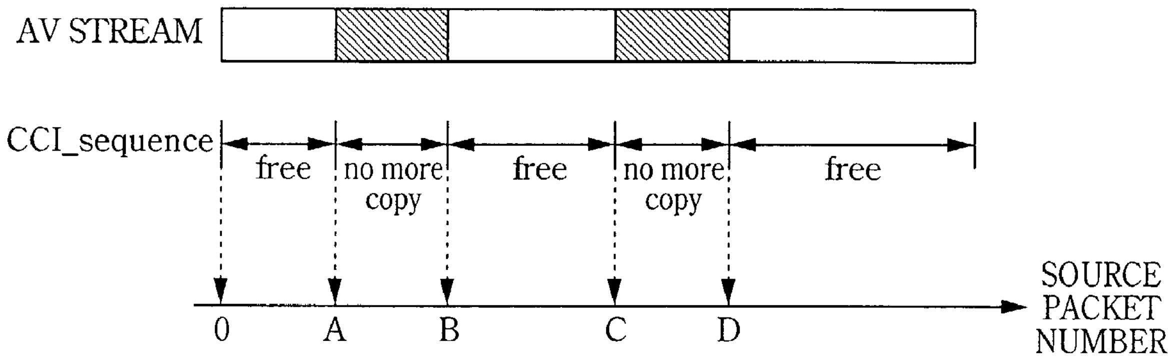
FIG. 9 is a view showing an exemplary CCI-sequence.

FIG. 9 shows an exemplary CCI-sequence. In the example shown in FIG. 9, a clip AC stream file has five program sequences in which "free" and "no more copy" exist in a mixed manner.

FIG. 10 shows a syntax of CCI_sequence_info( ).

"Length" indicates the number of bytes from a byte immediately after this length field to the last byte of CCI_sequence_info( ).

Recording_mode is a mode indicating whether the recording of the AV stream file is cognizant recording or non-cognizant recording. FIG. 13 shows the meaning of the value of recording_mode. Cognizant recording is a recording mode in which, when recording a transport stream of digital broadcast or the like, CCI coded in the transport stream (a descriptor or watermark having CCI and called an "embedded CCI") can be analyzed. Non-cognizant recording is a recording mode in which, when recording a transport stream of digital broadcast or the like, CCI coded in the transport stream cannot be analyzed. When recording an input transport stream using non-cognizant recording and an IEEE1394 digital interface, limitation to the recording of the transport stream is made on the basis of the value of an EMI (encryption mode indicator) in the IEEE1394 isochronous packet header.

Num_of_CCI_sequence indicates the number of CCI-sequences in the target AV stream file.

SPN_CCI_sequence_start indicates an address where the CCI-sequence starts in the AV stream file. SPN_CCI_sequence_start represents a size based on the source packet number as a unit, and counting from zero as an initial value is started at the first source packet of the AV stream file. The values of SPN_CCI_sequence_start entered in CCI_sequence_info( ) are arrayed in an ascending order. Since a delay time is necessary for a recording device to analyze the CGMS of an input video or the CCI of an input stream and detect its change, SPN_CCI_sequence_start may indicate a source packet that is within a predetermined time interval from the actual change point of the CCI in the AV stream.

Stream_status( ) shows the content of the CCI in that CCI-sequence.

FIG. 11 shows an exemplary syntax of stream_status( ).

Status_CCI/EMI shows the content of the CCI of that CCI-sequence. FIG. 14 shows the meaning of its value. When carrying out self-encoding and MPEG2 recording of an input video, the value of status_CCI/EMI is decided by analyzing a CGMS signal in the input signal. In the case of cognizant recording, the value of status_CCI/EMI is decided by analyzing a descriptor having CCI in the transport stream. In the case of non-cognizant recording, the value of status_CCI/EMI is decided by analyzing an EMI (encryption mode indicator) in the IEEE1394 isochronous packet header.

As for is_status_WM_valid, if its value is 1, the value of status_WM subsequent thereto is valid. If its value is 0, the value of status_WM subsequent thereto is invalid. If the value of is_status_WM_valid is 1, it is indicated that the watermark was analyzed and recorded when recording the AV stream. Since standardization of watermarking presently is not yet completed (as of June, 2001), the value of is_status_WM_ valid may be zero for a recording device which is manufactured before recording limitations by watermarking in recording devices becomes mandatory.

Status_WM shows the content of the CCI represented by the watermark of the CCI-sequence. FIG. 14 shows the meaning of its value.

In the syntax shown in FIG. 11, status_CCI/EMI and status_WM are independently managed. In general, these two are supposed to represent the same CCI status. Even if status_CCI/EMI and status_WM represent different CCI statuses, the recording device can correctly analyze the CCI and watermark of the input stream and record the update thereof in CCI_sequence_info. If status_CCI/EMI and status_WM have two different CCI statuses, which value has a higher priority as the CCI of the recorded AV stream depends on the application provided in the recording device.

FIG. 12 shows another exemplary syntax of stream_ status( ) . In this example, information of stream_status( ) is most simplified.

As for is_free, if its value is 1, the CCI of that CCI-sequence represents "Copy Free". If its value is 0, the CCI of that CCI-sequence does not represent "Copy Free". If status_ CCI/EMI is "00" and status_WM is "00" (is_status_WM_ valid=1), is_free is 1.

CCI_sequence_info( ) shown in FIG. 8 is useful for searching for a "Copy Free" stream part in a clip when recording a clip AV stream recorded in a recording medium to another recording medium, or for inspecting whether a "No More Copy" stream part and a "Copy Free" part exist in a mixed manner in the clip AV stream. Referring to CCI_sequence_ info( ), the time for this inspection can be significantly reduced. For this inspection, it is not necessary to read out the clip AV stream from the beginning to the end from the recording medium and analyze copy control information embedded therein.

Figure 15A:
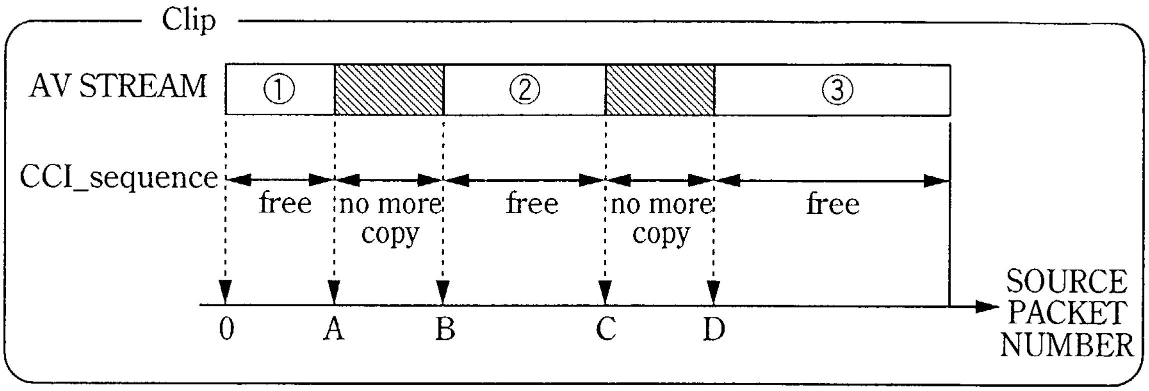
FIGS. 15A and 15B are views for explaining the relation between the clip and the CCI-sequence in the case of copying a "Copy Free" stream part from a copy source (reproducing device on the output side) to a copy destination (recording device on the input side).
Figure 15B:
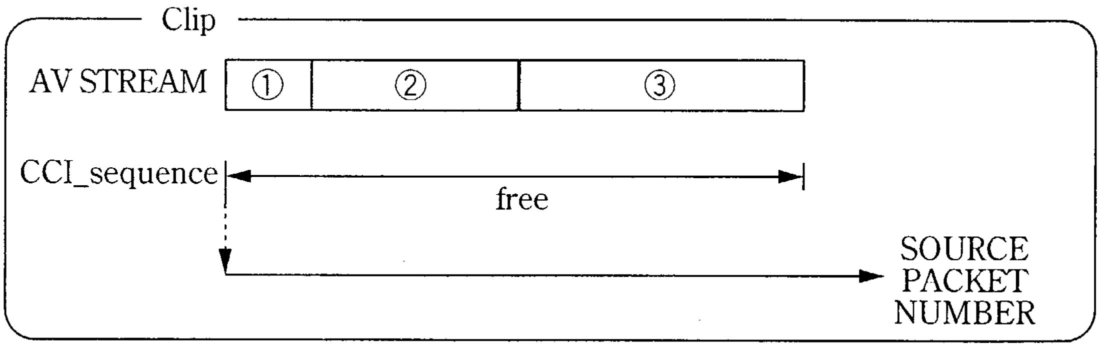

FIGS. 15A and 15B are views for explaining the relation between a clip and a CCI-sequence in the case of copying a "Copy Free" stream part from a copy source (reproducing device on the output side) to a copy destination (recording device on the input side). FIG. 15A shows a clip AV stream file and its CCI_sequence_info( ) recorded at the copy source (reproducing device on the output side). This CCI_sequence_info( ) shows that "Copy Free" stream parts and "No More Copy" stream parts exist in this AV stream. Therefore, it can be understood that the whole AV stream cannot be copied to another recording medium. It can be seen that the "Copy Free" stream parts include a part having source packet numbers 0 to (A−1) (i.e., part ①), a part having source packet numbers B to (C−1) (i.e., part ②) and a part having source packet numbers D to the end (part ③). The recording device shows the user the stream parts that can be copied. If the user agrees, the recording device transmits only the "Copy Free" stream parts to the recording device at the copy destination. In FIG. 15A, as information of stream_status( ), an example of status_CCI/EMI, status_WM and an example of is_free are shown in CCI_sequence_info( ).

FIG. 15B shows a clip AV stream and its CCI_sequence_info( ) recorded at the copy destination (recording device on the input side). Only the parts ①, ② and ③ shown in FIG. 15A are recorded and CCI_sequence_info( ) shows that this whole AV stream is "Copy Free".

Now, the description goes back to the syntax of CCI_sequence_info( ) shown in FIG. 10.

Integrity_Check_Value shown in FIG. 10 is a code for indicating that the content of the CCI of CCI_sequence_info( ) has not been falsified. This is a code calculated from an input of data from the first byte of CCI_sequence_info( ) to a byte immediately before Integrity_Check_Value, by using a predetermined cryptographic algorithm. This cryptographic algorithm may be, for example, an algorithm described in ISO/IEC9797 (information technology—security techniques—data integrity mechanism using a cryptographic check function employing a block cipher algorithm).

If a malicious user has rewritten the content of the CCI of CCI_sequence_info( ) from "No More Copy" to "Copy Free", the recording device can detect the falsification of CCI_sequence_info( ) by inspecting the value of this Integrity_Check_Value. When the falsification of CCI_sequence_info( ) is detected, CCI_sequence_info( ) cannot be trusted any more. Therefore, the recording device may disable copying of the AV stream using this CCI_sequence_info( ). Moreover, in order to prevent falsification of the content of CCI_sequence_info( ), CCI_sequence_info( ) may be scrambled or the entire clip information file may be scrambled.

FIG. 16 shows another exemplary syntax of CCI_sequence_info( ). In this example, Time_stamp_CCI_sequence_start is used instead of SPN_CCI_sequence_start in the syntax shown in FIG. 10. That is, in this example, a time stamp for a change point of the CCI in the AV stream is stored in CCI_sequence_info( ). The time stamp may be, for example, a video or audio presentation time stamp at a change point of the CCI in the AV stream. Alternatively, the time stamp may be an arrival time stamp indicating the time when a transport packet at a change point of the CCI in the AV stream arrives at the decoder.

Figure 17A:
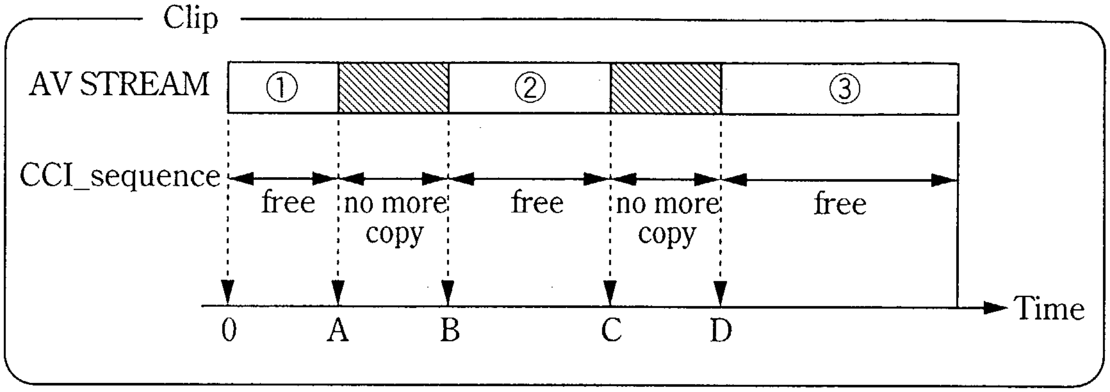
FIGS. 17A and 17B are views for explaining the relation between the clip and the CCI-sequence in the case of copying a "Copy Free" stream part from a copy source (reproducing device on the output side) to a copy destination (recording device on the input side), where the CCI_sequence_info( ) shown in FIG. 16 is used.
Figure 17B:
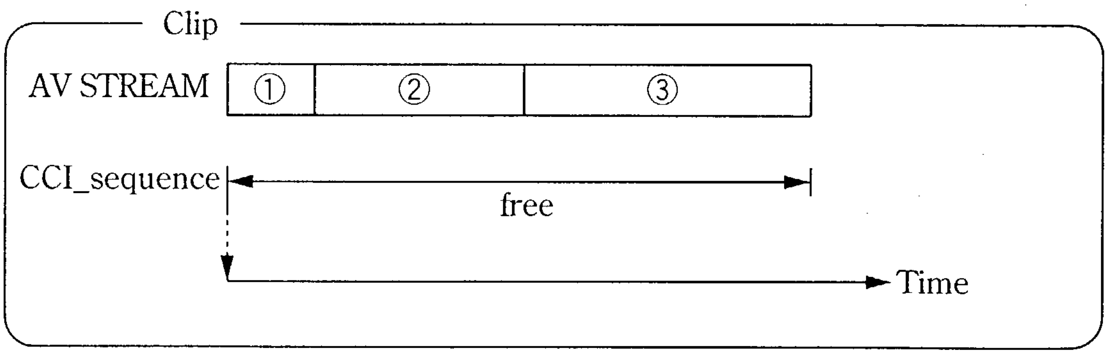

FIGS. 17A and 17B show the relation between a clip and a CCI-sequence in the case of copying a "Copy Free" stream part from a copy source (reproducing device on the output side) to a copy destination (recording device on the input side), where CCI_sequence_info( ) shown in FIG. 16 is used. Similarly to the case shown in FIGS. 15A and 15B, by using CCI_sequence_info( ), a "Copy Free" part can be specified in the AV stream on the basis of the time stamp and can be transmitted to the recording device at the copy destination.

In the present embodiment, when recording an AV stream, information of CCI_sequence_info( ) is prepared and recorded together with the AV stream using the data formats described above in detail. Thus, the status of plural pieces of copy control information existing in the AV stream can be learned by reading information of CCI_sequence_info( ), without reading out the AV stream from the beginning to the end for analyzing the copy control information.

A system structure to which the present invention is applied will now be described.

Figure 18:
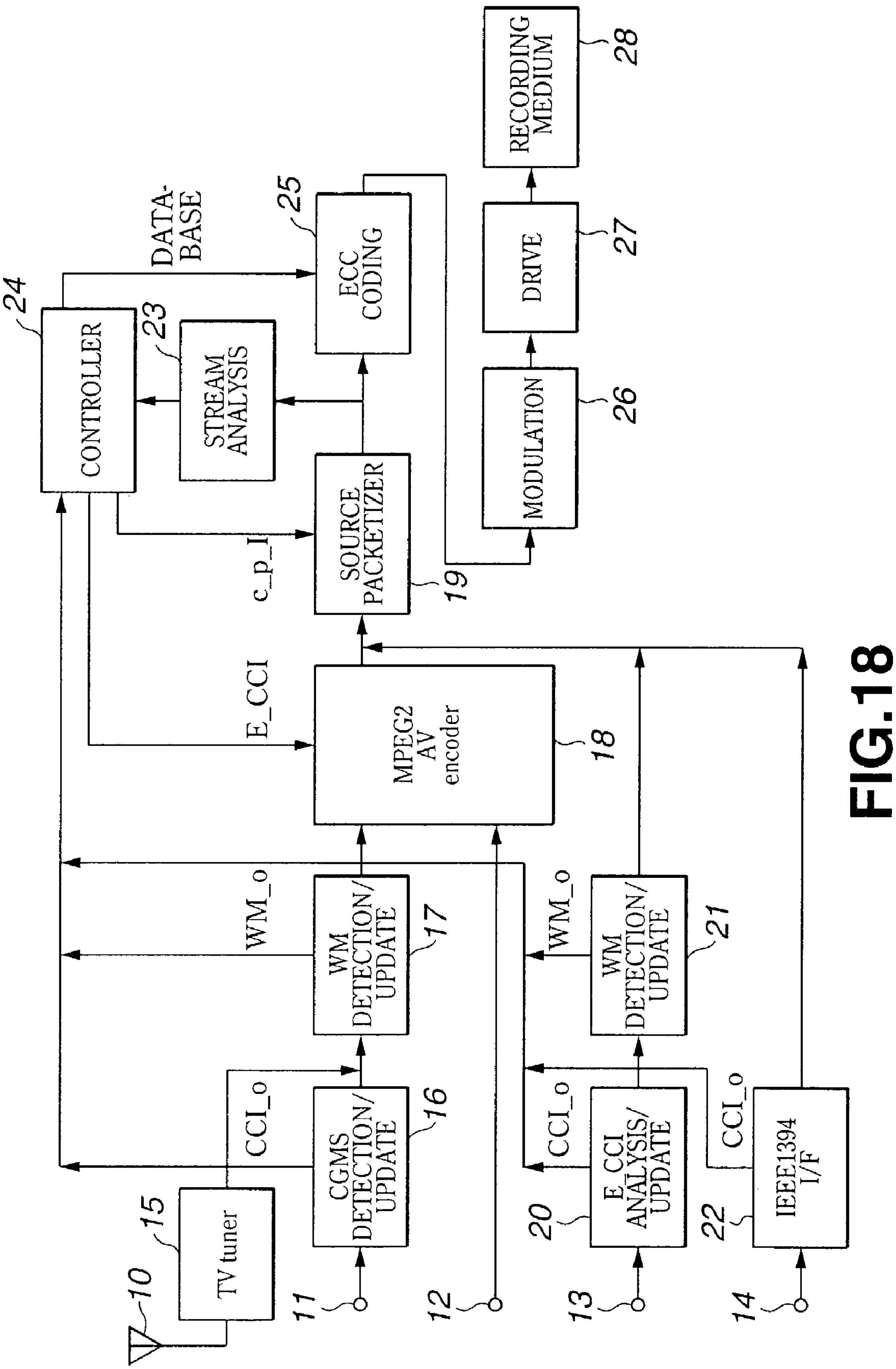
FIG. 18 is a block diagram showing a recording device to which the present invention is applied.

FIG. 18 is a block diagram showing a recording device to which the present invention is applied. This recording device has terminals 10, 11, 12, 13 and 14 used as input terminals. The recording device also has a TV tuner 15 for separating a video signal from an RF input of input video at the terminal 10, a CGMS detection/update unit 16 for analyzing CGMS of the input video, a WM (watermark) detection/update unit 17 for analyzing a watermark of the input video, an MPEG2 AV encoder 18 for coding the input video/audio signal, and a source packetizer 19 for supplying an AV stream made up of source packets. The recording device also has an E_CCI analysis/update unit 20 for analyzing CCI (E_CCI or embedded CCI) coded in an input transport stream, a WM detection/update unit 21 for analyzing a watermark of input video, and an IEEE1394 interface (I/F) 22 for analyzing the EMI in a header of an isochronous packet. Moreover, the recording device has a stream analysis unit 23 for counting the packet number of an input source packet stream, a controller 24 for preparing CCI_sequence_info( ), an ECC coding unit 25, a modulation unit 26, a drive 27, and a recording medium 28, which is a DVR.

In the recording device shown in FIG. 18, four modes are presented. The first mode is a mode for recording an AV stream obtained by self-encoding a video signal of an RF input from the terminal 10. The second mode is a mode for recording an AV stream obtained by self-encoding video and audio inputs from the terminals 11 and 12. The third mode is a mode for recording a transport stream input from the terminal 13 by cognizant recording. The fourth mode is a mode for recording a transport stream input from the terminal 14 by non-cognizant recording. In the recording device to which the present embodiment is applied, when recording these AV streams, CCI_sequence_info( ) is prepared and stored into the recording medium 28.

First, the mode for recording an AV stream obtained by self-encoding video and audio inputs from the terminals 11 and 12 will be described.

The CGMS detection/update unit 16 analyzes CGMS (CGMS-A or CGMS-D) of input video by a predetermined method and supplies the CCI (indicated by CCI_o in FIG. 18) of an AV stream to be recorded, to the controller 24. The CGMS detection/update unit 16 also supplies the input video to the WM detection/update unit 17. The WM detection/update unit 17 analyzes a watermark of the input video by a predetermined method and supplies the WM (indicated by WM_o in FIG. 18) of the AV stream to be recorded, to the controller 24. The WM detection/update unit 17 also supplies the input video to the MPEG2 AV encoder 18.

The controller 24 determines the value of E_CCI (embedded CCI) to be inserted in an MPEG stream encoded by the MPEG2 AV encoder 18 by a predetermined method based on the inputted CCI_o and WM_o. The MPEG2 AV encoder 18 codes the input video/audio signal and supplies a transport stream to the source packetizer 19.

The controller 24 also determines the value of copy_permission_indicator (indicated by c_p_I in FIG. 18) to be described in a source packet header by a predetermined method based on the inputted CCI_o and WM_o. The source packetizer 19 supplies an AV stream made up of source packets to the stream analysis unit 23 and the ECC coding unit 25.

The stream analysis unit 23 counts the packet number of the input source packet stream and supplies the current packet number to the controller 24. The stream analysis unit 23 also supplies the current timing stamp of the input source packet stream to the controller 24. The controller 24 detects a change in the inputted CCI_o and WM_o and prepares CCI_sequence_info. The controller 24 also prepares data of a clip information file having CCI_sequence_info and supplies it to the ECC coding unit 25.

The AV stream and the clip information file inputted to the ECC coding unit 25 are processed by the ECC coding unit 25, the modulation unit 26 and the drive 27, and are then recorded to the recording medium as an AV stream file and a clip information file, respectively.

Next, the mode for recording an AV stream obtained by self-encoding a video signal of an RF input from the terminal 10 will be described. The TV tuner 15 separates the video signal of the RF input and supplies it to the WM detection/update unit 17. The WM detection/update unit 17 analyzes a watermark of the input video by a predetermined method and supplies the WM (indicated by WM_o in FIG. 18) of an AV stream to be recorded, to the controller 24. The WM detection/update unit 17 also supplies the input video to the MPEG2 AV encoder 18. The subsequent processing is the same as the above-described processing at the MPEG2 AV encoder 18 and in the subsequent stages.

Next, the mode for recording a transport stream input from the terminal 13 by cognizant recording will be described. The E_CCI analysis/update unit 20 analyzes the CCI (embedded CCI) coded in the input transport stream by a predetermined method and supplies the CCI (indicated by CCI_o in FIG. 18) of an AV stream to be recorded, to the controller 24. The E_CCI analysis/update unit 20 also supplies the input transport stream to the WM detection/update unit 21. The WM detection/update unit 21 analyzes a watermark of the input video by a predetermined method and supplies the WM (indicated by WM_o in FIG. 18) of the AV stream to be recorded, to the controller 24. The WM detection/update unit 21 also supplies the input transport stream to the source packetizer 19. The subsequent processing is the same as the above-described processing at the source packetizer 19 and in the subsequent stages.

Next, the mode for recording a transport stream from the terminal 14 by non-cognizant recording will be described. The IEEE1394 interface 22 analyzes the EMI in a header of an inputted isochronous packet by a predetermined method and supplies the CCI (indicated by CCI_o in FIG. 18) of an AV stream to be recorded, to the controller 24. The IEEE1394 interface 22 also supplies the input transport stream to the source packetizer 19. The subsequent processing is the same as the above-described processing at the source packetizer 19 and in the subsequent stages.

FIG. 19 is a view for explaining copy control processing in the case where an input signal is a video input or a TS input of cognizant recording. In FIG. 19, the CCI and WM in "status of input signal" represent the CCI and WM held by the respective input signals.

First, when the CCI of an input signal is "00", the CGMS detection/update unit 16 or the E_CCI analysis/update unit 20 provides CCI_o=00. When the CCI of an input signal is "10", the CGMS detection/update unit 16 or the E_CCI analysis/update unit 20 provides CCI_o=01 to update the CCI of the input signal. When the CCI of an input signal is "01" or "11", the input AV stream cannot be recorded.

Next, when the WM of an input signal is "00", the WM detection/update unit 18 or the WM detection/update unit 21 provides WM_o=00. When the WM of an input signal is "10", the WM detection/update unit 17 or the WM detection/update unit 21 provides WM_o=101 to update the WM of the input signal. When the WM of an input signal is "101" or "11", the input AV stream cannot be recorded.

The controller 24 sets a value of the same meaning as CCI_o into E_CCI described in an AV stream to be recorded, except for the case where an input video is an RF input. When an input video is an RF input, the controller 24 sets a value of the same meaning as WM_o into E_CCI described in the AV stream. Moreover, the controller 24 sets a value of the same meaning as CCI_o in status_CCI/EMI of CCI_sequence_info( ) and copy_permission_indicator(c_p_I) of a source packet header, except for the case where an input video is an RF input. When an input video is an RF input, the controller 24 sets a value of the same meaning as WM_o into status_CCI/EMI of CCI_sequence_info( ) and copy_permission_indicator(c_p_I) of a source packet header. Furthermore, the controller 24 sets a value of the same meaning as WM_o into status WM_ of CCI_sequence_info( ).

FIG. 20 is a view for explaining copy control processing by the controller 24 in the case where an input signal is a TS input of non-cognizant recording.

First, when the EMI of an input signal is "00", the IEEE1394 interface 22 provides CCI_o=00. When the EMI of an input signal is "10", the IEEE1394 interface 22 provides CCI_o=01. When the EMI of an input signal is "01" or "11", the input AV stream cannot be recorded. The controller 24 sets a value of the same meaning as CCI_o into status_E_CCI/EMI of CCI_sequence_info( ) and copy_permission_indicator(c_p_I) of a source packet header.

Figure 21:
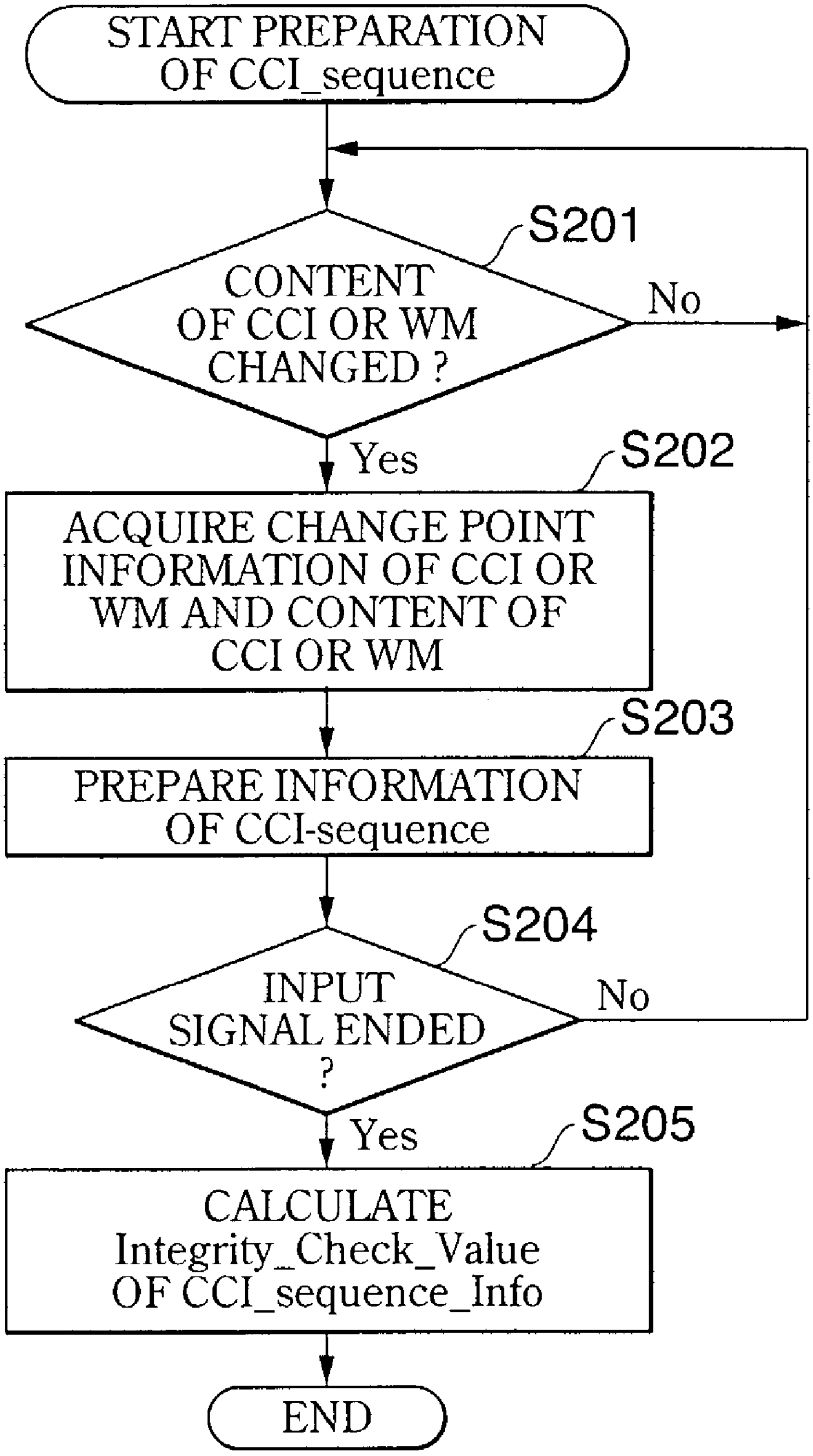
FIG. 21 is a flowchart for explaining processing of a CCI-sequence in the case where an input signal is a video input or a TS input of cognizant recording.

FIG. 21 is a flowchart for explaining the processing of a CCI-sequence in the case where an input signal is a video input or a TS input of cognizant recording. In preparation of a CCI-sequence, first, whether the content of the CCI or WM of an input AV signal has been changed is checked (step S201). A loop of processing is repeated until the CCI or WM is changed. When the CCI or WM is changed, change point information of the CCI or WM and the content of the CCI or WM are acquired (step S202). More specifically, the address of the change point of the CCI or WM in the AV stream and the content of the CCI or WM are acquired. Alternatively, the time stamp of the change point of the CCI or WM in the AV stream and the content of the CCI or WM are acquired. After that, information of a CCI-sequence is prepared (step S203), and whether the input signal has ended is checked (step S204). If the input signal has not ended, the processing returns to step S201. If the input signal has ended, Integrity_Check_Value of CCI_sequence_info is calculated (step S205) and the processing ends.

Figure 22:
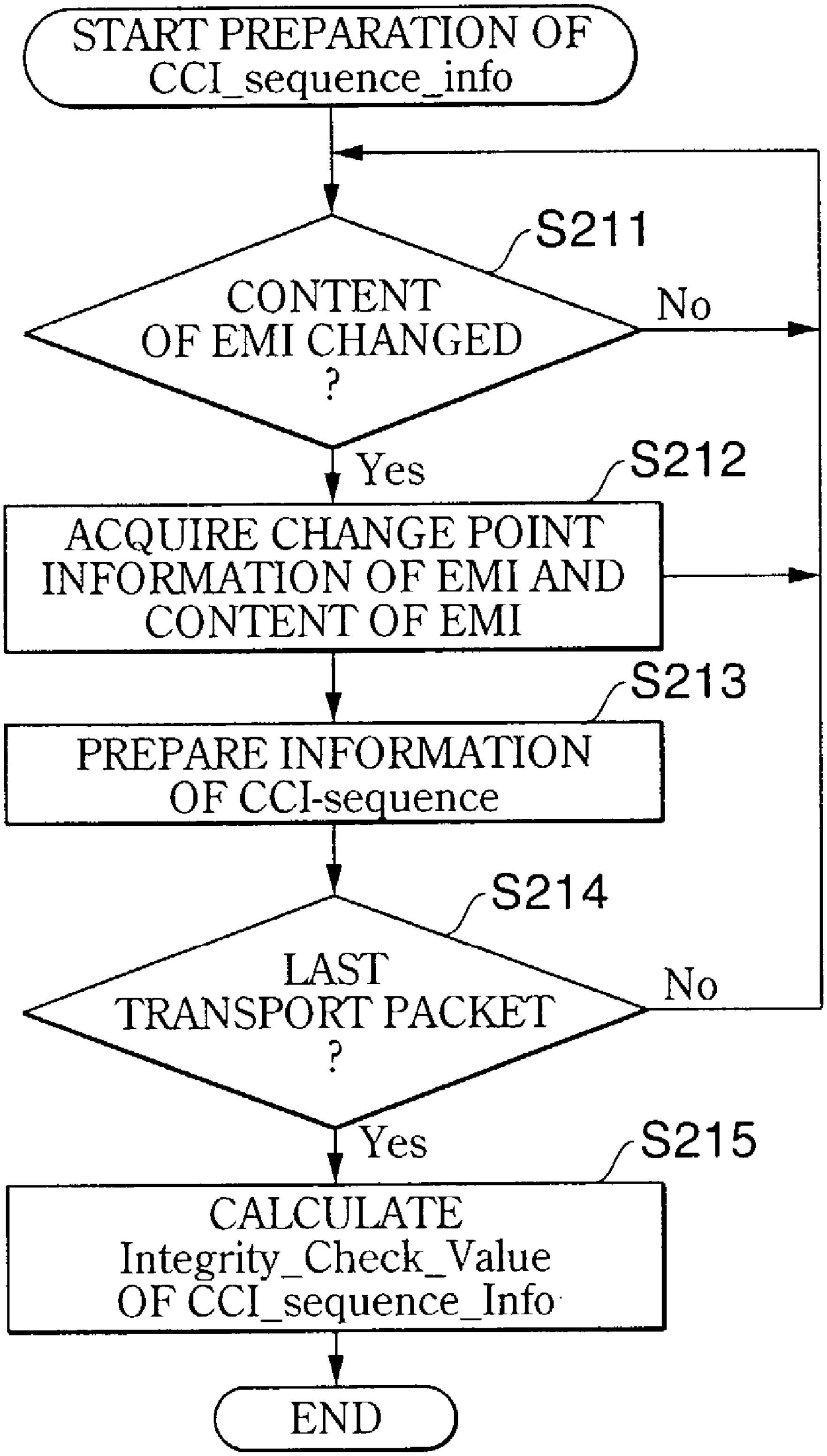
FIG. 22 is a flowchart for explaining processing of a CCI-sequence in the case where an input signal is a TS input of non-cognizant recording.

FIG. 22 is a flowchart for explaining the processing of a CCI-sequence in the case where an input signal is a TS input of non-cognizant recording. In preparation of a CCI_sequence_info, first, whether the content of the EMI of an input AV signal has been changed is checked (step S211). A loop of processing is repeated until the EMI is changed. When the EMI is changed, change point information of the EMI and the content of the EMI are acquired (step S212). More specifically, the address of the change point of the EMI in the AV stream and the content of the EMI are acquired. Alternatively, the time stamp of the change point of the EMI in the AV stream and the content of the EMI are acquired. After that, information of a CCI-sequence is prepared (step S213), and whether it is the last transport packet is checked (step S214). If it is not the last transport packet, the processing returns to step S211. If it is the last transport packet, Integrity_Check_Value of CCI_sequence_info is calculated (step S215) and the processing ends.

In this manner, information of a CCI-sequence of an AV stream to be recorded is prepared and recorded together with the AV stream.

Figure 23:
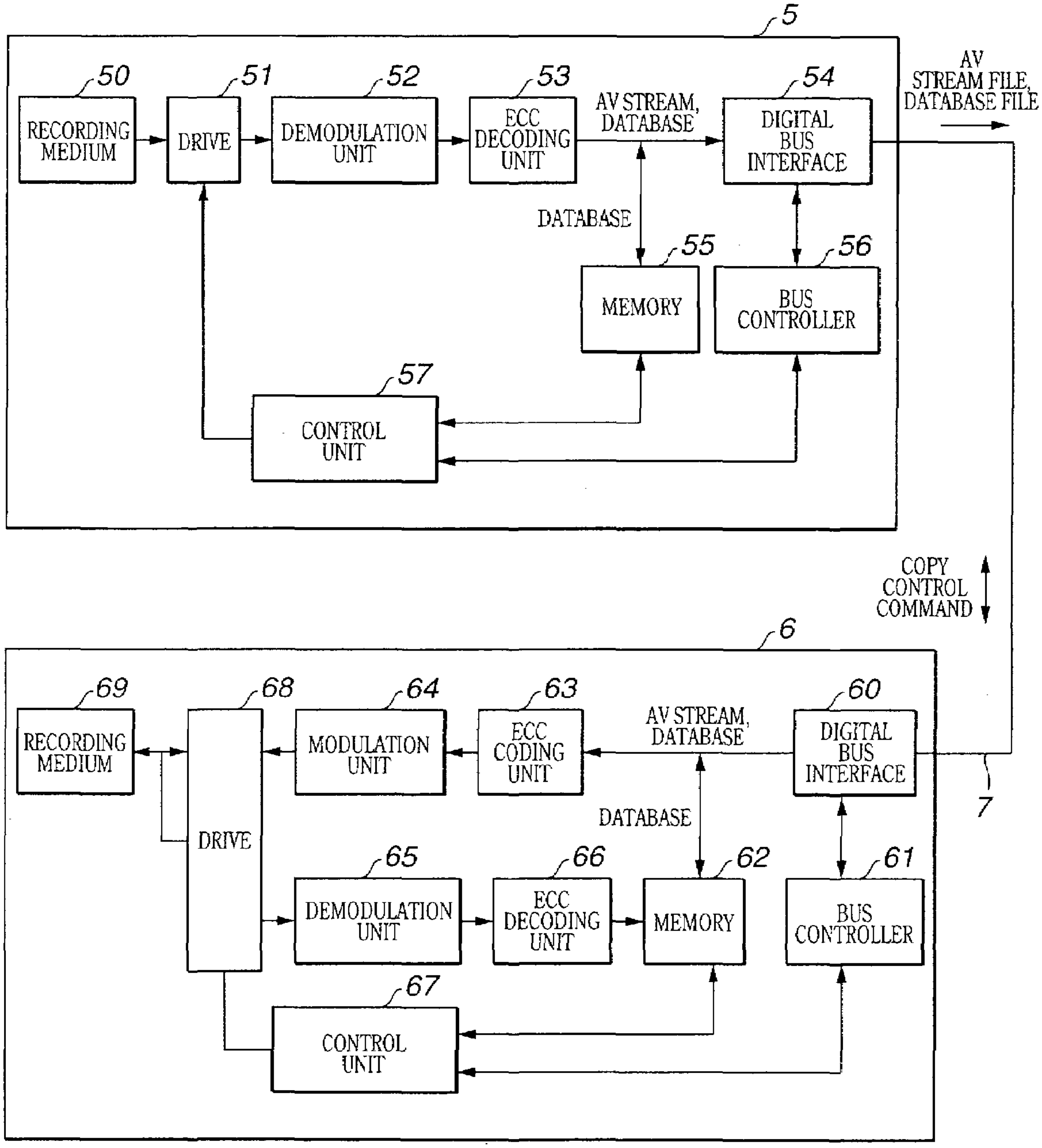
FIG. 23 is a block diagram showing a structure in the case of copying an AV stream file and a related database file to a DVR from a reproducing device of a copy source (output side) to a recording device of a copy destination (input side) via a digital bus.

FIG. 23 is a block diagram showing a structure in the case of copying an AV stream file and a related database file in a DVR from a reproducing device 5 of a copy source (output side) to a recording device 6 of a copy destination (input side) via a digital bus.

The recording device 5 has a recording medium 50, which is a DVR, a drive 51 for reading data from the recording medium 50, a demodulation unit 52, an ECC decoding unit 53, a digital bus interface 54 for communicating with the recording device 6, a memory 55, a bus controller 56, and a control unit 57 for controlling the whole reproducing device 5. The recording device 6 has a digital bus interface 60 for communicating with the reproducing device 5, a bus controller 61, a memory 62, an ECC coding unit 63, a modulation unit 64, a demodulation unit 65, an ECC decoding unit 66, a control unit 67 for controlling the whole recording device 6, a recording medium 69, which is a DVR, and a drive 68 for reading data from and writing data to the recording medium 69. The reproducing device 5 and the recording device 6 transmit data to and receive data from each other through a digital bus 7.

First, a copy control command carrying information, which designates copying of a desired play list recorded on the recording medium 50 in the reproducing device 5 to the recording medium 69 in the recording device 6, is inputted to the reproducing device 5 via a user interface (not shown). This command is inputted to the control unit 57 via the digital bus interface 54 and the bus controller 56.

The control unit 57 determines a stream part of an AV stream that is necessary for reproducing the play list and instructs the drive 51 to read out the AV stream data from the recording medium 50. The control unit 57 also instructs the drive 51 to read out database files related to the play list (a play list file, a clip information file and a thumbnail file) from the recording medium 50. Moreover, the control unit 57 gives an instruction to supply the AV stream data, which is read out via the demodulation unit 52 and the ECC decoding unit 53 to the digital bus interface 54, as an AV stream file.

Meanwhile, the database files corresponding to the AV stream data read out from the recording medium 50 are inputted to the memory 55 via the demodulation unit 52 and the ECC decoding unit 53. On the basis of the data in the memory 55, the control unit 57 prepares a database (clip information file and play list file) that is necessary for reproducing the AV stream file outputted from the digital bus interface 54. The control unit 57 also prepares a clip corresponding to the AV stream file and a thumbnail file to be used by the play list file. The control unit 57 then gives an instruction to supply the newly prepared database files (a clip information file, a play list file and a thumbnail file) from the memory 55 to the digital bus interface 54.

The bus controller 56 controls file output (transmission) from the digital bus interface 54. The control unit 57 instructs the bus controller 56 to output the AV stream file and the database files from the digital bus interface 54. The AV stream file and the database files are inputted to the recording device 6 of the copy destination via the digital bus 7.

The bus controller 61 in the recording device 6 of the copy destination controls file input from the digital bus interface 60. This bus controller 61 and the bus controller 56 of the reproducing device 5 exchange file copy control commands and control the timing of data transmission/reception. The control unit 67 of the recording device 6 gives an instruction to record the AV stream file, inputted to the digital bus interface 60, to the recording medium 69 through the processing at the ECC coding unit 63, the modulation unit 64 and the drive 68. The control unit 67 also gives an instruction to write the database files inputted to the digital bus interface 60 to the memory 62.

The control unit 67 also gives an instruction to read out the database files (Info.drv file and thumbnail file) recorded on the recording medium 69 to the memory 62 through the processing at the drive 68, the demodulation unit 65 and the ECC decoding unit 66. The control unit 67 then updates the info.drv file and the thumbnail file in the memory 62. Specifically, a play list file name to be newly recorded is added to a table of play lists in the Info.drv file of the copy destination, and a thumbnail to be newly recorded is added to the thumbnail file of the copy destination. Moreover, the control unit 67 gives an instruction to read out the database files from the memory 62 and to record these database files to the recording medium 69 through the processing at the ECC coding unit 63, the modulation unit 64 and the drive 68.

Figure 24:
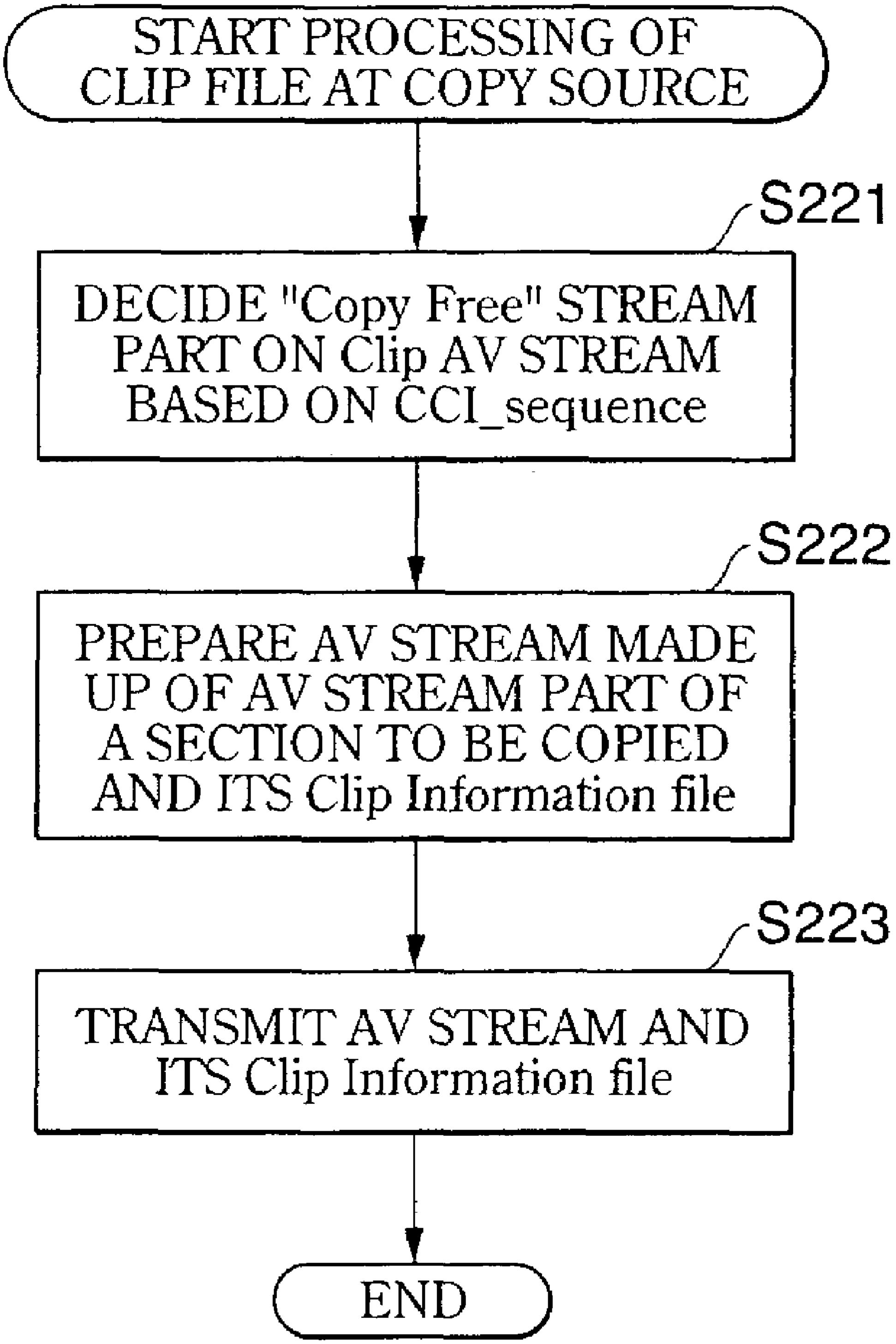
FIG. 24 is a flowchart for explaining processing by a reproducing device (copy source) in the case of copying a clip AV stream file from the reproducing device of the copy source (output side) to a recording device of a copy destination (input side).

FIG. 24 is a flowchart for explaining the processing by the recording device 5 (copy source) in the case of copying a clip AV stream file from the reproducing device 5 of the copy source (output side) to the recording device 6 of the copy destination (input side). First, a "Copy Free" stream part on a clip AV stream is determined on the basis of the CCI-sequence (step S221). Next, the control unit 57 prepares an AV stream made up of an AV stream part of a section to be copied and its clip information file (step S222). Finally, the AV stream and the prepared clip information file are transmitted through the digital bus interface 54 (step S223). By using information of the CCI-sequence, copy processing of the AV stream file is controlled.

Next, a modification of the syntax of CCI_sequence_info( ) will be described. As information of the CCI-sequence, a table having only the address or time stamp at which copy control information (CCI) in the AV stream changes may be prepared and recorded together with the AV stream. In this case, prior to copy processing of the AV stream, a source packet existing at the address or time stamp where the CCI in the AV stream changes is read out from the recording medium. Then, copy_permission_indicator of that source packet is checked to obtain copy control information of each CCI-sequence.

Also in this case, the inspection time for searching for a "Copy Free" stream part in the AV stream can be reduced by referring to CCI_sequence_info( ). For this inspection, it is not necessary to read out the clip AV stream from the beginning to the end from the recording medium and analyze the copy control information. That is, for this inspection, it suffices to read out only the source packet, existing at the address or time stamp where the CCI in the AV stream changes, from the recording medium.

As described above in detail, in the present invention, management information such as CCI_sequence_info( ) is prepared and recorded together with an AV stream. Thus, a "No More Copy" stream part and a "Copy Free" stream part existing in one AV stream can be easily found. To find these parts, it is not necessary to read out the AV stream from the beginning to the end from the recording medium and analyze its copy control information. Therefore, the inspection time for this can be significantly reduced. That is, when copying the content of data recorded in a recording medium to another recording medium, the content of the data recorded in the recording medium and reproduction information can be properly managed.

In the present invention, status_CCI/EMI and status_WM are independently managed. In general, they represent the same CCI status. In the present embodiment, however, even when status_CCI/EMI and status_WM represent different CCI statuses, the recording device can correctly analyze the CCI and watermark of an input stream and record the update of these into CCI_sequence_info.

Moreover, in the present invention, a code for preventing falsification of information of CCI_sequence_info( ) can be recorded. Thus, even if a malicious user has rewritten the content of the CCI of CCI_sequence_info( ) from "No More Copy" to "Copy Free", the recording device can detect the falsification of CCI_sequence_info( ) by checking the value of Integrity_Check_Value. In the present invention, information of CCI_sequence_info( ) can be scrambled and then recorded. Thus, falsification of the content of CCI_sequence_info( ) can be prevented.

The above-described various processing can be provided as a program executed on a computer device such as a video information recording device or a video information reproducing device. This program may be provided in the form of a storage medium such as a CD-ROM and read by reading means such as a CD-ROM drive in a computer device. Alternatively, this program may be provided from a program transmission device situated at a remote location via a network and installed in a computer device. In the present invention, though a DVR is used as the storage medium in the above description, other storage media such as a storage medium having a similar data format can also be used.

As described above, copy control of video information can be properly managed by using the present invention.

The invention claimed is:

1. A video information recording device, comprising:

detection means for detecting copy control information in inputted video information;

change point information acquisition means for acquiring change point information of copy control information corresponding to video information to be recorded based on said copy control information detected by said detection means;

management information generation means for generating management information for managing said copy control information based on said change point information; and recording means for recording said management information and said video information;

wherein the video information is included in a transport stream file and said management information is included in a corresponding separate information file; and the separate information file containing the management information is managed under a different directory from the transport stream file, and the video information being a stream having a first part with a first copy control information associated therewith and a second part with a second copy control information associated therewith, in which the first copy control information is different from the second copy control information, and said management information being arranged such that copy control status of the entire stream can be obtained without reading the entire stream.

2. The video information recording device as claimed in claim 1, wherein said change point information is information related to an address of a change point or a time of the change point in said copy control information.

3. The video information recording device as claimed in claim 1, wherein said management information is table information including change point information of copy control information in an AV (audio/visual) stream.

4. The video information recording device as claimed in claim 1, further comprising falsification prevention processing means for performing falsification prevention processing of said management information.

5. The video information recording device as claimed in claim 4, wherein said falsification prevention processing means performs falsification prevention processing by using a code indicating that a content of said management information has not been falsified or by using scrambling of said management information.

6. A recording method, comprising:

inspecting whether content of copy control information or a watermark in an inputted signal is changed;

acquiring change point information of said copy control information or said watermark that is changed;

preparing management information for managing said copy control information or said watermark based on said change point information; and recording said management information;

wherein the inputted signal is included in a transport stream file and said management information is included in a corresponding separate information file; and the separate information file containing the management information is managed under a different directory from the transport stream file, and the inputted signal being a stream having a first part with a first copy control information associated therewith and a second part with a second copy control information associated therewith, in which the first copy control information is different from the second copy control information, and said management information being arranged such that copy control status of the entire stream can be obtained without reading the entire stream.

7. The recording method as claimed in claim 6, wherein a code indicating whether content of said management information has been falsified is detected, and, if falsification is detected, recording of a data stream is prohibited.

8. A computer storage medium readable by a computer, said storage medium comprising:

an information recording area in which are recorded:

a clip including a stream of video information and attached information of the stream;

a clip stream file; and a separate information file, wherein said separate information file contains copy control information and management information for managing a change point in copy control information of said stream; and said separate information file being managed under a different directory from the transport stream file, and the stream having a first part with a first copy control information associated therewith and a second part with a second copy control information associated therewith, in which the first copy control information is different from the second copy control information, and said management information being arranged such that copy control status of the entire stream can be obtained without reading the entire stream.

9. The storage medium as claimed in claim 8, wherein said management information includes information indicating a number of said copy control information and information indicating an address or a time of the change point in said copy control information.

10. The storage medium as claimed in claim 8, wherein said clip information file contains a code for indicating that content of said management information has not been falsified.

11. The storage medium as claimed in claim 8, wherein said first part can be copied and said second part cannot be copied.

* * * * *